Nov. 3, 1970   T. F. CARMICHAEL ET AL   3,538,392

CONTROL SYSTEM FOR ELECTRIC BRAKES

Filed July 8, 1968

INVENTORS
Thomas F. Carmichael,
BY Charles F. Bosley,
Joseph R. Papp.

Harness, Dickey & Pierce
ATTORNEYS.

United States Patent Office 3,538,392
Patented Nov. 3, 1970

3,538,392
CONTROL SYSTEM FOR ELECTRIC BRAKES
Thomas F. Carmichael, Drayton Plains, Charles F.
Bosley, Clawson, and Joseph R. Papp, Birmingham,
Mich., assignors to Syncro Corporation, Oxford, Mich.,
a corporation of Michigan
Filed July 8, 1968, Ser. No. 743,123
Int. Cl. H01h 47/32
U.S. Cl. 317—148.5                                    12 Claims

ABSTRACT OF THE DISCLOSURE

A solid state control system for electric brakes in which the current to the brakes is controlled generally by a solid state element located in parallel relationship to the brake coils.

SUMMARY BACKGROUND OF THE INVENTION

The present invention relates to control systems for electric brakes.

In tractor-trailer combinations often the tractor is provided with a pneumatic or hydraulic brake system while the trailer is equipped with an electrical brake system. In the present invention the electric brakes are controlled by utilizing a solid state device which is connected in parallel with the brake coils. This provides a safety feature in the event of failure of the solid state device. If the device fails in an open circuit condition braking would still be available since the brake coils would not be disconnected from the source. On the other hand, if the failure of the device is a short circuit, some limited braking effect could probably still be available depending on the impedance of the short circuit; in addition, the solid state device could be fused such that in the event of a failure in a shorted condition the fuse would blow and braking still could be provided.

Therefore, it is an object of the present invention to provide an improved system for electric brakes.

It is still another object of the present invention to provide for an improved system of the above noted type in which the system includes a solid state controlled conductive device located in parallel with the brake coils.

Figure 1:
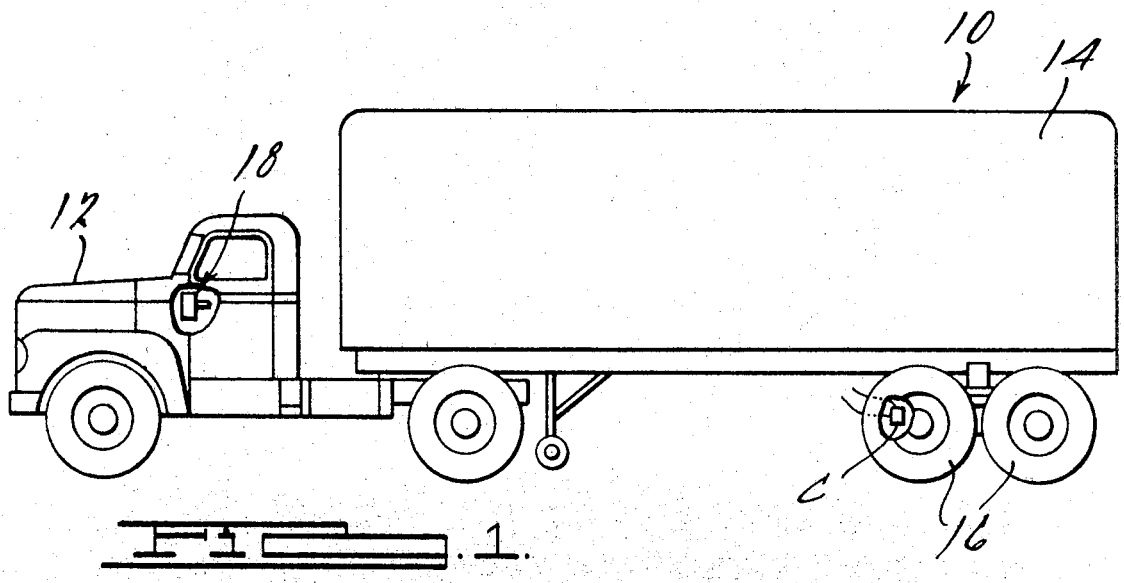
Figure 2:
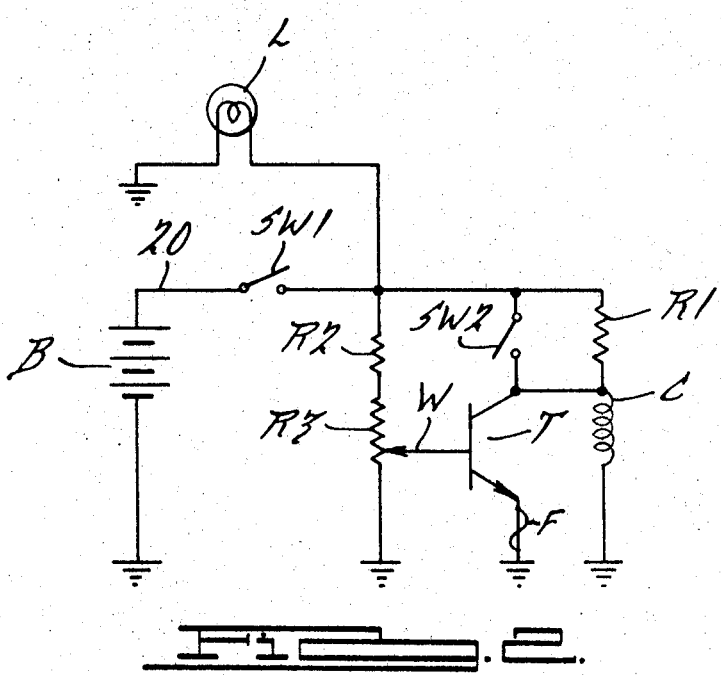

Other objects, features, and advantages of the present invention will become apparent from the subsequent description and the appended claims, taken in conjunction with the accompanying drawings, in which:

FIG. 1 is a pictorial drawing of a tractor-trailer combination generally depicting portions of the control system for electric brakes of the present invention; and FIG. 2 is an electrical circuit diagram for the system of FIG. 1.

Looking now to the drawings, a tractor-trailer combination is generally indicated by the numeral 10 and includes a tractor 12 and a trailer 14 with the wheels 16 of the trailer 14 being equipped with electrically actuated brakes which are part of the electric brake system including an electric coil C (shown diagrammatically) which is electrically connected by a pair of wires to a control circuit 18 located at the driver's compartment of the tractor 12. The specific details of the control circuit 18 and the connection of the coil C are shown in schematic diagram of FIG. 2. The apparatus of FIG. 2 is connected to a battery B which has a negative ground with a conductor 20 connected to the positive terminal of B. The brake coil C is connected in series with the posiitve terminal of the battery B through line 20 and contacts of a brake light switch SW1 and a dropping resistor R1. A switch SW2 is connected in parallel across the resistor R1 and functions in a manner to be described. A brake light L is connected from the switch SW1 to the ground such that when switch SW1 is closed light L will be energized. A transistor T of the NPN type has its principal electrodes connected in parallel across the brake coils C and hence has its collector connected to the end of the brake coils C connected with the resistor R1 and has its emitter connected to the ground via a fuse F. Transistor T has its base connected to a movable wiper W of a potentiometer R3 which is part of a voltage divider network including a fixed resistor R2. Thus, the conduction of transistor T will be varied in accordance with variations in the position of the wiper W along the potentiometer R3. The switches SW1 and SW2 are provided to be actuated by the brake pedal along with the conventional tractor brake. The coils C represent all of the coils for all of the wheels 16 connected in parallel.

In operation as the operator of the vehicle applies the brakes for the tractor 12 the switch SW1 is closed in response to pressure. This completes the circuit from the conductor 20 on the positive side of the battery B through the resistor R1 to the brake coils C. At this time, the braking effort is slight and hence low or slight energization of the coils C is desired. Hence the wiper W is in a selected position along the potentiometer R3 such that the transistor T is generally in its fully on or conductive condition. Hence, only limited current will pass through brake coils C while substantially more current will be passed around coils C through the transistor T. Upon further increase of the brake pressure, by the operator, the wiper W will be moved along the potentiometer R3 such as to increase the bias at the base of transistor T reducing the magnitude of the current through its emitter-collector circuit; this in effect increases the impedance of the emitter-collector circuit such that more emitter current will pass through the brake coils C resulting in increased braking effect. This process continues until the impedance of the transistor T has been increased to such a point that little or no current is passed through its collector-emitter circuit and substantially full current is passed through the coils C. At this position, however, full braking current is still not provided to the coils C in view of the dropping resistor R1. Therefore, switch SW2 is constructed such that upon attainment of a maximum preselected brake pressure switch SW2 will be closed shunting out the resistor R1 thereby permitting maximum current to the brake coils C. Note that with the circuit arrangement as shown, in the event of failure of transistor T in an open circuit condition, application of brakes can be obtained since current can still flow to the brake coils C. In the event of failure of transistor T in a short circuit condition, fuse F would open the circuit and again current could flow to the brake coils C and braking could be realized. Note, in this regard, that with either type of failure the resistor R1 would still limit current to coils C (unless full braking was applied at the tractor by the operator) whereby the tendency for a locked wheel condition to occur due to the excessive brake application will be inhibited.

The actuation of the switches SF1 and SW2 can be provided to be either operated in response to brake pressure on the tractor brakes or can be operated by linkages responsive to the travel of the brake pedal for the tractor brakes, etc. Likewise, the wiper W can be moved either by means responsive to tractor brake pressure or by means responsive to tractor brake pedal travel.

The function of resistor R1 is to provide a voltage divider network, with the parallel circuit provided by the brake coils C and the emitter-collector circuit of transistor T relative to battery B whereby the transistor T can effectively control and vary the current through coils C. Resistor R1 also provides for current limiting. The magnitude of resistance R1 is also selected such that with transistor T substantially non-conductive close to full braking current through coils C is provided. Note that even with resistor R1 in the circuit, i.e. switch SW2 opened, and with transistor T generally non-conductive the braking effect caused by the resultant current approaches the maximum effect which is attainable when R1 is shunted out of the circuit, i.e. switch SW2 closed. The magnitude of resistance R1 is also selected to limit the current to safe operating levels when transistor T is substantially fully conductive and also limits current to coils C in the event of failure of transistor T as noted.

It has been found that for four brake coils each having approximately 4 ohms satisfactory results have been attained when R1 is approximately 25 ohms, R2 is 200 ohms and R3 is 50 ohms.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A control circuit for controlling the actuation of electric brakes for a wheeled vehicle with the brakes including a brake coil member comprising: a solid state controlled conductive device connected in parallel across the coil and varying in impedance in accordance with variations in magnitude of an input signal, and control means actuated by the vehicle operator for varying the magnitude of said input signal in accordance with variations in the desired braking effect as caused by the operator.

2. The circuit of claim 1 including an impedance member connected in series with the parallel combination of said device and the coil and having a preselected magnitude for permitting variation in the magnitude of the current in the coil by said device over generally the full operating range for the brakes.

3. The circuit of claim 1 including an impedance member connected in series with the parallel combination of said device and the coil and having a preselected magnitude to limit the current to said parallel combination when the impedance of said device is at a preselected low value.

4. The circuit of claim 3 with said preselected magnitude of said impedance member selected to provide a magnitude of current to the coil effective to provide substantially full braking effect when the impedance of said device is at a preselected high value.

5. The circuit of claim 4 with said preselected magnitude of said impedance member selected to permit variation in the magnitude of the current to the coil by said device over generally the full operating range for the brake.

6. The circuit of claim 5 including a switch means for bypassing said impedance member in response to a desired high braking effect as caused by the operator.

7. The circuit of claim 6 with said device being an asymmetric current conducting device having a pair of principal electrodes connected across the coil.

8. The circuit of claim 7 with said device being a transistor type device having a control electrode, said control means including a variable impedance device connected to said control electrode, said impedance member being generally of a fixed magnitude.

9. The circuit of claim 7 with said parallel combination and said impedance member being connected across a source of potential.

10. The circuit of claim 2 with said impedance member having a magnitude for limiting current to the coil in the event of failure of said device.

11. The circuit of claim 10 including current responsive means connected with said device for providing a high impedance in series therewith in response to current of a preselected high magnitude.

12. The circuit of claim 11 with said current responsive means being a fuse.

References Cited

UNITED STATES PATENTS

| 3,112,418 | 11/1963 | Peras. | |
|---|---|---|---|
| 3,305,176 | 2/1967 | Brace. | |
| 3,371,253 | 2/1968 | Hubbard | 317—148.5 X |
| 3,423,135 | 1/1969 | Beltramo | 317—148.5 X |

LEE T. HIX, Primary Examiner

U.S. Cl. X.R.

188—158